(12) United States Patent
Xia et al.

(10) Patent No.: US 12,316,433 B1
(45) Date of Patent: May 27, 2025

(54) SYSTEM FOR GRANT-FREE TRANSMISSIONS

(71) Applicant: AMAZON TECHNOLOGIES, INC., Seattle, WA (US)

(72) Inventors: Pengfei Xia, San Diego, CA (US); Runhua Chen, Plano, TX (US); Arunabha Ghosh, Bellevue, WA (US); Timothy Leo Gallagher, Woodinville, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 279 days.

(21) Appl. No.: 17/807,983

(22) Filed: Jun. 21, 2022

Related U.S. Application Data

(60) Provisional application No. 63/269,456, filed on Mar. 16, 2022.

(51) Int. Cl.
*H04B 7/185* (2006.01)
(52) U.S. Cl.
CPC ..... *H04B 7/18513* (2013.01); *H04B 7/18519* (2013.01)
(58) Field of Classification Search
CPC .................. H04B 7/18513; H04B 7/18519
USPC ....................................................... 455/12.1
See application file for complete search history.

(56) References Cited

U.S. PATENT DOCUMENTS

| | | | | |
|---|---|---|---|---|
| 8,654,815 | B1 * | 2/2014 | Forenza | H04B 7/0684 375/267 |
| 10,694,399 | B1 * | 6/2020 | Tran | H01Q 3/01 |
| 10,812,992 | B1 * | 10/2020 | Tran | H04B 7/0695 |
| 10,985,811 | B2 * | 4/2021 | Forenza | H04B 7/10 |
| 11,190,246 | B2 * | 11/2021 | Forenza | H04B 7/022 |
| 11,190,247 | B2 * | 11/2021 | Forenza | H04B 7/0626 |
| 11,196,467 | B2 * | 12/2021 | Forenza | H04B 7/0626 |

(Continued)

OTHER PUBLICATIONS

Tse, et al., "MIMO I: spatial multiplexing and channel modeling", from Fundamentals Wireless Communication chapter 7, Cambridge University Press, 42 pages. Retrieved from the Internet on May 27, 2022. URL: https://web.stanford.edu/~dntse/Chapters_PDF/Fundamentals_Wireless_Communication_chapter7.pdf.

(Continued)

*Primary Examiner* — April G Gonzales
(74) *Attorney, Agent, or Firm* — Lindauer Law PLLC

(57) ABSTRACT

A satellite constellation provides communication between user terminals (UTs) and ground stations that connect to other networks. Grant-free transmissions allow the UTs access to the satellite uplink as needed. Each UT is assigned a unique preamble that represents a combination of repetition pattern (from a set of patterns) and precoding vectors (from a set of precoding vectors). The repetition pattern specifies two or more uplink slots to transmit the same data. The precoding vectors specify different phase angles for the respective uplink slots. The UT transmits a signal using the preamble, repetition pattern, and precoding vectors. The satellite receives these signals, and stores signal data representative of the signals, including repetitions. Overlapping signals from different UTs received during the same timeslot are separated using successive interference cancellation or a linear equalizer. The recovered signal may then be processed to recover data encoded therein.

20 Claims, 8 Drawing Sheets

(56) References Cited

U.S. PATENT DOCUMENTS

| | | | | |
|---|---|---|---|---|
| 11,394,436 | B2* | 7/2022 | Forenza | H04B 7/024 |
| 11,451,275 | B2* | 9/2022 | Forenza | H04B 7/0456 |
| 2010/0316163 | A1* | 12/2010 | Forenza | H04B 7/024 375/296 |
| 2011/0002371 | A1* | 1/2011 | Forenza | H04B 17/309 375/227 |
| 2011/0002410 | A1* | 1/2011 | Forenza | H04B 7/0617 375/267 |
| 2011/0002411 | A1* | 1/2011 | Forenza | H04L 25/03343 375/267 |
| 2011/0003606 | A1* | 1/2011 | Forenza | H04L 25/03343 455/501 |
| 2011/0003607 | A1* | 1/2011 | Forenza | H04B 7/0413 455/501 |
| 2011/0003608 | A1* | 1/2011 | Forenza | H04B 7/01 455/500 |
| 2017/0223653 | A1* | 8/2017 | Weitnauer | H04W 56/0045 |
| 2020/0358185 | A1* | 11/2020 | Tran | H01Q 1/04 |

OTHER PUBLICATIONS

Abramson, Norman, "The Aloha System—Another alternative for computer communications", The University of Hawaii, Nov. 17-19, 1970, 6 pgs. Retrieved from the Internet: URL: https://www.clear.rice.edu/comp551/papers/Abramson-Aloha.pdf.

Casini, et al., "Contention Resolution Diversity Slotted Aloha (CRDSA): An Enhanced Random Access Scheme for Satellite Access Packet Networks", IEEE Transactions on Wireless Communications 6, 2007, 3 pgs. Retrieved from the Internet: URL: https://ieeexplore.ieee.org/document/4155680.

Ghanbarinejad, et al., "Irregular repetition slotted Aloha with multiuser detection", 2013 10th Annual Conference on Wireless On-demand Network Systems and Services (WONS), 3 pgs. Retrieved from the Internet: URL: https://arxiv.org/pdf/2111.06140.pdf.

Jafar, et al., "Degrees of Freedom for the MIMO Interference Channel", The University California, 7 pgs. Retrieved from the Internet: URL: http:/newport.eecs.uci.edu/~syed/papers/c35.pdf.

Roberts, Lawrence G., "Aloha Packet System With and Without Slots and Capture", Telenet Communications Corporation, Jun. 26, 1972, 15 pgs. Retrieved from the Internet: URL: https://dl.acm.org/doi/10.1145/1024916.1024920.

Srivatsa, et al., "Performance Analysis of Irregular Repetition Slotted Aloha with Multi-Cell Interference", Indian Institute of Science, 7 pgs. Retrieved from the Internet: URL: https://arxiv.org/abs/2205.07026v1.

Stuber, et al., "Broadband MIMO-OFDM Wireless Communications", 24 pgs. Retrieved from the Internet: URL: https://barry.ece.gatech.edu/pubs/journal/mimo-ofdm.pdf.

Valtolina, Roberto, "Making the Most of MIMO", Nokia, Sep. 19, 2013, 7 pgs. Retrieved from the Internet: URL: https://www.nokia.com/blog/making-most-mimo/.

Vu, et al., "MIMO Wireless Linear Precoding", IEEE Signal Processing Magazine, Sep. 2007, 20 pgs. Retrieved from the Internet: URL: http://www.ece.tufts.edu/~maivu/papers//SPM_MIMO_Wireless_Precoding.pdf.

* cited by examiner

| INDEX ASSIGNMENT DATA 172 ||||||
|---|---|---|---|---|
| IV 402 | UT ID 302 | PREAMBLE 304 | REPETITION PATTERN 306 | PRECODING VECTOR 308 |
| 1 | 1 | {PREAMBLE1} | [1 2] | [+1 +1] |
| 2 | 2 | {PREAMBLE2} | [1 2] | [+1 -1] |
| 3 | 3 | {PREAMBLE3} | [1 3] | [+1 +1] |
| 4 | 4 | {PREAMBLE4} | [1 3] | [+1 -1] |
| 5 | 5 | {PREAMBLE5} | [1 4] | [+1 +1] |
| 6 | 6 | {PREAMBLE6} | [1 4] | [+1 -1] |
| 7 | 7 | {PREAMBLE7} | [1 5] | [+1 +1] |
| 8 | 8 | {PREAMBLE8} | [1 5] | [+1 -1] |
| 9 | 9 | {PREAMBLE9} | [1 6] | [+1 +1] |
| 10 | 10 | {PREAMBLE10} | [1 6] | [+1 -1] |
| 11 | 11 | {PREAMBLE11} | [2 3] | [+1 +1] |
| 12 | 12 | {PREAMBLE12} | [2 3] | [+1 -1] |
| 13 | 13 | {PREAMBLE13} | [2 4] | [+1 +1] |
| 14 | 14 | {PREAMBLE14} | [2 4] | [+1 -1] |
| 15 | 15 | {PREAMBLE15} | [2 5] | [+1 +1] |
| 16 | 16 | {PREAMBLE16} | [2 5] | [+1 -1] |
| 17 | 17 | {PREAMBLE17} | [2 6] | [+1 +1] |
| 18 | 18 | {PREAMBLE18} | [2 6] | [+1 -1] |
| 19 | 19 | {PREAMBLE19} | [3 4] | [+1 +1] |
| 20 | 20 | {PREAMBLE20} | [3 4] | [+1 -1] |
| 21 | 21 | {PREAMBLE21} | [3 5] | [+1 +1] |
| 22 | 22 | {PREAMBLE22} | [3 5] | [+1 -1] |
| 23 | 23 | {PREAMBLE23} | [3 6] | [+1 +1] |
| 24 | 24 | {PREAMBLE24} | [3 6] | [+1 -1] |
| 25 | 25 | {PREAMBLE25} | [4 5] | [+1 +1] |
| 26 | 26 | {PREAMBLE26} | [4 5] | [+1 -1] |
| 27 | 27 | {PREAMBLE27} | [4 6] | [+1 +1] |
| 28 | 28 | {PREAMBLE28} | [4 6] | [+1 -1] |
| 29 | 29 | {PREAMBLE29} | [5 6] | [+1 +1] |
| 30 | 30 | {PREAMBLE30} | [5 6] | [+1 -1] |

FIG. 4

SYSTEM FOR GRANT-FREE TRANSMISSIONS

PRIORITY

This application claims priority to, and the benefit of, U.S. Provisional Patent Application Ser. No. 63/269,456 filed on 16 Mar. 2022 titled "System for Grant-Free Transmissions", the contents of which are hereby incorporated by reference into the present disclosure.

BACKGROUND

A satellite may provide communication service to many user terminals. These user terminals may be in contention with one another for use of an uplink to send data from individual user terminals to the satellite.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates index values indicative of different combinations of repetition patterns and precoding vectors, according to some implementations.

Figure 1:
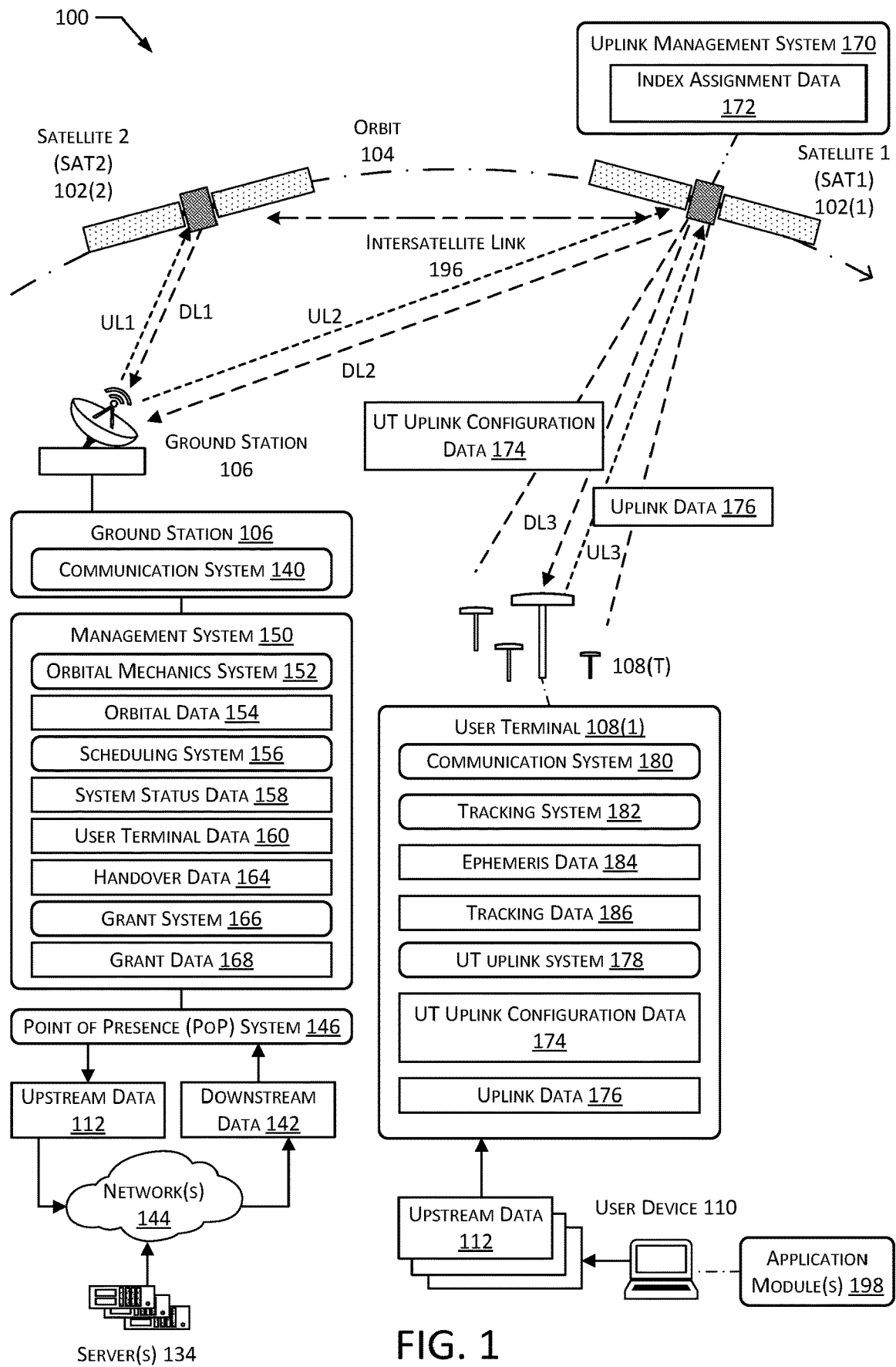
FIG. 1 illustrates a system to provide user terminals (UTs) with grant-free access to satellites in a constellation of satellites, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, the cost to place and maintain individual satellites is relatively high. Even with a large constellation of satellites, given the large geographic coverage area of a given satellite and a substantial number of user terminals (UTs) served by each satellite, contention for uplink resources is substantial. For example, a satellite may provide service to many UTs within a geographic area or "spot". These individual UTs may not be able to "hear" one another, and may transmit data to the satellite at the same time. If not properly managed, such overlapping transmissions may result in a failure of the satellite to decode the data sent by the UT, seriously impairing operation.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate contention for satellite uplink resources, and management of those resources. For example, an individual satellite is only within communication range of a UT for a few minutes, and the relative positions of the UTs being serviced and the satellite changes. This motion results in changing geometry between the UTs and the satellites.

An additional complication is the large number of UTs serviced by the constellation. This large number of UTs results from many factors, including larger geographic coverage, lower cost of UT allowing wide adoption, increased demand for network access even in remote locations, and so forth. As a result, a satellite may provide communication service to thousands, tens of thousands, or more UTs within a given spot.

Traditional techniques to manage access to an uplink do not provide adequate performance in such a constellation of satellites. One technique that allocates a specified time and frequency to each individual UT is infeasible as there is insufficient time and bandwidth to provide a discrete combination to every UT in service. For example, each UT may be "granted" communication resources specifying time and frequency to transmit data. Another technique involves the satellite polling individual UTs, however this introduces substantial delays in data transfer due to time of flight for these signals as well as the delays involved in polling many units. Other techniques are "grant free" in that they allow a UT to transmit data on the uplink without being granted communication resources in advance. However, given the number of UTs serviced, testing indicates that such traditional techniques result in the satellite being unable to decode usable data as the uplink signals interfere with one another at the receiver onboard the satellite. By analogy, consider a room filled with people yelling out words. If you are listening to two people, you may be able to understand their speech if the words overlap. However, if you are listening to three thousand people all you will hear is noise and not the words.

Variations of these grant-free techniques include permitting a UT to transmit on the uplink at any time, permitting a UT to transmit starting at any timeslot, repeated transmissions on the uplink at irregular intervals, and so forth. However, these methods fail at the size and scale of operation afforded by a constellation of satellites described herein.

Described are techniques that allow satellites to reliably decode uplink data sent on uplink signals by UTs operating with grant-free access to the uplink. UTs may transmit uplink data as they have data enqueued for transmission, avoiding overhead of transmissions associated with polling. The satellite is able to reliably extract the discrete uplink signals that are received, and thus decode the uplink data encoded by those uplink signals.

An uplink resource is provided for UTs to send uplink signals to a satellite. Each UT serviced by a given satellite is associated with a specific preamble that is associated with a combination of repetition pattern and precoding vector to use for transmission of uplink signals. The repetition pattern is selected from a set of predefined repetition patterns. The precoding vector is selected from a set of predefined precoding vectors. Each unique combination of repetition pattern and precoding vector is associated with a different index value. Each index value is also associated with a unique preamble.

When a UT has data to transmit to the satellite 102, preamble and associated parameters such as the repetition pattern and the precoding vector are used. An uplink signal is generated that begins with the specified preamble, and is transmitted according to the repetition pattern specified, and the specified precoding vector. For example, the repetition pattern may specify a particular plurality of timeslots during which the same uplink data is sent as an uplink signal. Each repeated transmission of the uplink data may differ from other transmissions in a specified fashion. For example, a specific phase rotation may be applied that is associated with a particular timeslot.

At the satellite, during any given timeslot several uplink signals may be received. In some timeslots there may be no transmissions, while in others there may be one or more transmissions simultaneously received. These uplink signals, represented as signal data, are then processed to extract individual uplink signals. The signal data may be divided into slot signal data, with each instance of slot signal data indicative of a particular portion of the signal data corresponding to signals received during a specified slot.

As mentioned above, each uplink signal contains a preamble that indicates the index value and thus a particular repetition value and precoding vector used for that uplink signal. In one implementation, the preamble may comprise an unmodulated carrier, in which the phase or other characteristics are used to represent the index value.

With the preamble providing information as to when repetitions for a given UT are expected, and the slot signal data representing the combined uplink signals for a given slot, it is possible to use a successive interference cancellation technique to progressively subtract previously distinguished uplink signals from slots that contain two or more uplink signals. For example, a first slot having a single first uplink signal is determined and processed. Based on the preamble for this first uplink signal transmitted during a first slot and the known repetition pattern associated with that preamble, it is possible to determine a second slot that includes a repeat of the first uplink signal. The first uplink signal may then be subtracted from the combined uplink signals received during the second slot. This process may be iterated using slot signal data from a plurality of slots, removing known uplink signals from the received signals, allowing for the recovery of the uplink signals and permitting successful decoding to determine uplink data.

By using the system and techniques described in this disclosure, overall system efficiency is substantially improved. A substantial increase in the number of UTs serviced by an uplink to a satellite is realized, allowing the system to provide communication services to many more UTs. The system also substantially reduces latency compared to other techniques, as UTs are able to send uplink data without undue delay compared to traditional techniques.

The system and techniques described may be used in conjunction with other techniques. For example, the uplink data may be used to convey a buffer data status (BDS) indicating a quantity of data that is enqueued by the UT for transmission to the satellite. Responsive to the BDS, the satellite may issue a grant that assigns specific uplink resources to the UT. The UT may then use this grant to transmit the enqueued upstream data.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. As the height of a relay station having a radio receiver and transmitter with its antennas increases above the ground, it is able to provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminals (UTs) 108, and user devices 110. Each user device 110 may execute one or more application modules 198. For example, the application modules 198 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 196 provides for communication between satellites 102 in the constellation.

One or more ground stations 106 are in communication with one or more satellites 102. The ground stations 106 may pass data between the satellites 102, a management system 150, networks 144 such as the Internet, and so forth. The networks 144 may be in communication with one or more servers 134. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks 144. For example, the ground station 106 may connect to a terrestrial fiber optic communication network. The ground station 106 may act as a network gateway, passing data between the one or more communication networks 144 and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth. In some implementations, the orbital data 154, or a portion thereof, may be provided to the UTs 108. For example, ephemeris data 184 indicative of orbital elements of at least some of the satellites 102 in the constellation may be sent to the UTs 108.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. These communication parameters may be associated with operation of an uplink to the satellite 102, downlink from the satellite 102 to the UT 108, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise a media access control (MAC) address, serial number, or other information. The user terminal data 160 may comprise cryptographic data, such as cryptographic keys, certificates, and so forth. The user terminal data 160 may comprise information such as a location of a particular UT 108. The user terminal data 160 may comprise information such as a satellite 102 subbeam that is associated with the UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2). The handover data 164, or a portion thereof, may be provided to the UTs 108. For example, handover data 164 for one or more future handovers may be sent to a UT 108. In some implementations, handover data 164 may be distributed to a set of UTs 108 that are located within a particular geographic area or "spot".

The resource scheduling system 156 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the resource scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, the secondary satellite 102(3), the UT 108, or other devices. For example, the second satellite 102(2) may use an ISL 196 to send the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

In some implementations, the management system 150 may include a grant system 166 that determines grant data 168. The grant system 166 may accept as input one or more of system status data 158, user terminal data 160, or information about one or more of upstream data 112 or downstream data 142. For example, the grant system 166 of the management system 150 may analyze the upstream data 112 from a particular UT 108 and downstream data 142 to the particular UT 108 to determine the grant data 168. In one implementation, a machine learning system may be trained to use scheduling input data to determine if the UT 108 is likely to have upstream data 112 to transmit to the satellite 102.

In some implementations grant data 168 may be determined responsive to a request. For example, a UT 108 may send a request for uplink resources. Responsive to the request, the satellite 102 or other portion of the system 100 may determine grant data 168 that allocates communication resources associated with an uplink to a satellite 102.

The grant data 168 is indicative of one or more parameters associated with uplink communication between the UT 108 and the satellite 102. For example, the grant data 168 may indicate the satellite identifier, subbeam identifier, uplink frequency, assigned timeslot, signal encoding, and so forth.

The grant system 166 of the management system 150 may send the grant data 168 to the satellite 102 that is in communication with the UT 108. In one implementation, a resource scheduler onboard the satellite 102 may then allocate uplink communication resources consistent with the grant data 168 and then send the grant data 168 to the UT 108. In another implementation, the resource scheduler onboard the satellite 102 may receive first grant data 168(1) from the management system 150 and generate second grant data 168(2). For example, the second grant data 168(2) may specify a particular frequency, timeslot, and so forth that is not specified in the first grant data 168(1).

The satellite 102 may utilize an onboard uplink management system (UMS) 170. The UMS 170 may coordinate operation of one or more uplinks to the satellite 102. For example, the UMS 170 may determine index assignment data 172 that is indicative of one or more parameters, such as preambles, repetition patterns, precoding vectors, and so forth that are assigned to particular UTs 108. The index assignment data 172 is discussed in more detail with regard to FIG. 4. The satellite 102 may use a first uplink that provides grant-free operation using the techniques described in this disclosure. The satellite 102 may also utilize a second uplink that provides grant-based access. For example, the first uplink may be used by the UT 108 to inform the satellite 102 that the UT 108 has upstream data 112 enqueued for transmission to the satellite 102. Once informed, the satellite 102 may issue the UT 108 grant data 168 that allocates communication resources associated with the second uplink. The UT 108 may then receive the grant data 168, and use the grant data 168 and allocated communication resources to transmit the enqueued upstream data 112.

The UMS 170 may send UT uplink configuration data (UCD) 174 to one or more UTs 108. The UT UCD 174 may be received by the UTs 108 to determine one or more parameters used to specify how the UT 108 will access the uplink. The UT UCD 174 is discussed in more detail with regard to FIG. 3. The UMS 170 may determine uplink data 176 that is transmitted from the UT 108 to the satellite 102, based on the UT UCD 174. Operation of the UMS 170 to determine the uplink data 176 is discussed in more detail with regard to FIGS. 4-8.

The UT 108 includes a communication system 180, such as a satellite network interface, to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes data between the constellation of satellites 102 and the user device 110. The UT 108 may connect to the user device 110 using a second network interface. For example, the second network interface may comprise a wireless local area network, wired local area network, terrestrial wide area network, and so forth. The user device 110 may execute one or more application modules 198. The data includes upstream data 112 sent by the user device 110 or downstream data 142 that is addressed to the UT 108 or the user device 110. For example, during operation the application module 198 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

The UT 108 includes a tracking system 182. The tracking system 182 uses ephemeris data 184 to determine tracking data 186. The ephemeris data 184 provides information indicative of orbital elements of the orbit 104 of one or more satellites 102. For example, the ephemeris data 184 may comprise orbital elements such as "two-line element" data for the satellites 102 in the constellation. The ephemeris data 184 may be stored in memory of the UT 108 as part of provisioning and shipment to an end user. After initial network entry, the UT 108 may receive ephemeris data 184 using the communication system 180.

The tracking system 182 may use the current location of the UT 108 and the ephemeris data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102, time of flight correction, or other information associated with a specified time. The determination of the tracking data 186 may be ongoing. For example, the first UT 108 may determine tracking data 186 every 100 ms, every second, every five seconds, or at other intervals.

The UT 108 includes a UT uplink system 178. The UT uplink system 178 may be used by the UT 108 to access the grant-free uplink to send uplink data 176 to the satellite 102. During operation, the UT uplink system 178 may use the UT UCD 174 to determine one or more parameters to use on the grant-free uplink. In one implementation, the UT UCD 174 may comprise an index value that is used to retrieve one or more parameters from a local copy of previously stored index assignment data 172 or a portion thereof. In another implementation, the UT UCD 174 may comprise a specific preamble that relates to a specific combination of repetition pattern and precoding vector. The index assignment data 172 is discussed in more detail with regard to FIG. 4. In one implementation the UT uplink configuration data 174 may be received by the UT 108 from the satellite 102. Based on the UT uplink configuration data 174, one or more parameters to use the grant-free uplink are determined. Based on the parameters, a particular preamble is prepended to the uplink signal conveying payload data. Operation of the UT uplink system 178 is discussed in more detail with regard to FIG. 5.

As mentioned above, responsive to the uplink data 176, the satellite 102 may send grant data 168. The satellite 102 may provide grant data 168 to the UT 108 to allocate communications resources on the uplink.

Based on the grant data 168, the UT 108 may begin to send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

The system 100 may include one or more point of presence (POP) systems 146. Each PoP system 146 may comprise one or more servers or other computing devices. Separate POP systems 146 may be located at different locations. In one implementation, a POP system 146 may be associated with providing service to a plurality of UTs 108 that are located in a particular spot or set of spots.

The POP systems 146 may manage communication between the system 100 and the network 144. For example, a first POP system 146 may receive the upstream data 112 and send that upstream data 112 to the network 144. In another example, the first POP system 146 may receive the downstream data 142 and proceed to attempt delivery of the downstream data 142 to the UT 108.

The POP system 146 is in communication with one or more ground stations 106(1), 106(2), . . . , 106(G) and the management system 150. In some implementations one or more functions may be combined. For example, the POP system 146 may perform one or more functions of the management system 150. In another example, the POP system 146 may be included in an integrated ground station 106.

The satellite 102, the ground station 106, the user terminal 108, the user device 110, the management system 150, the POP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
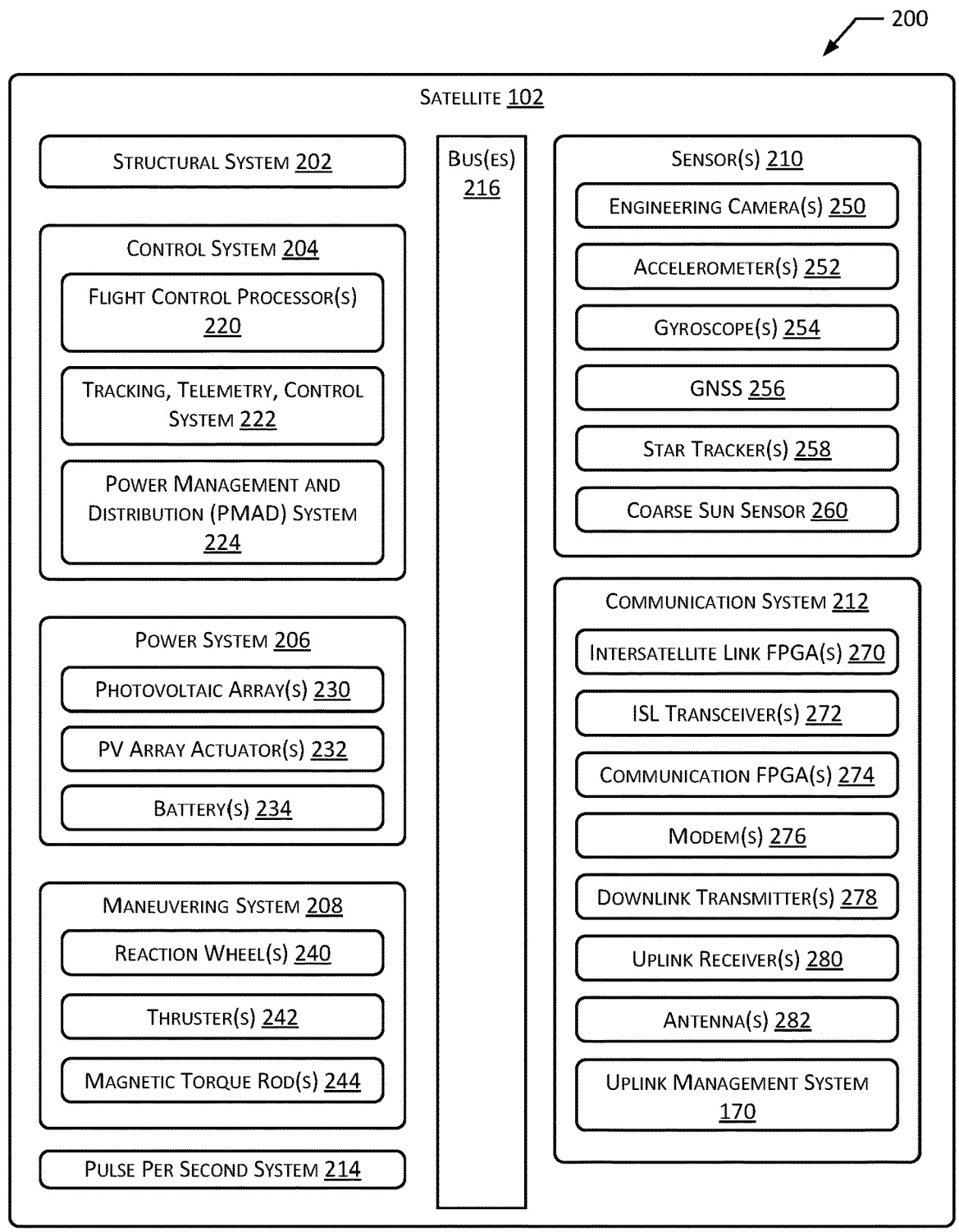
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted, or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 196. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may include the uplink management system 170 that facilitates UTs 108 access to the satellite 102. For example, the communication FPGA 274 may process signals received from one or more UTs 108 by the uplink receiver 280. These signals may be processed to decode the uplink data 176 conveyed by the individual uplink signals from respective UTs 108. The uplink management system 170 executing on the communications FPGA 274 may perform at least a portion of processes described herein. Information such as UT uplink configuration data 174 may be sent using the downlink transmitter 278.

Figure 3:
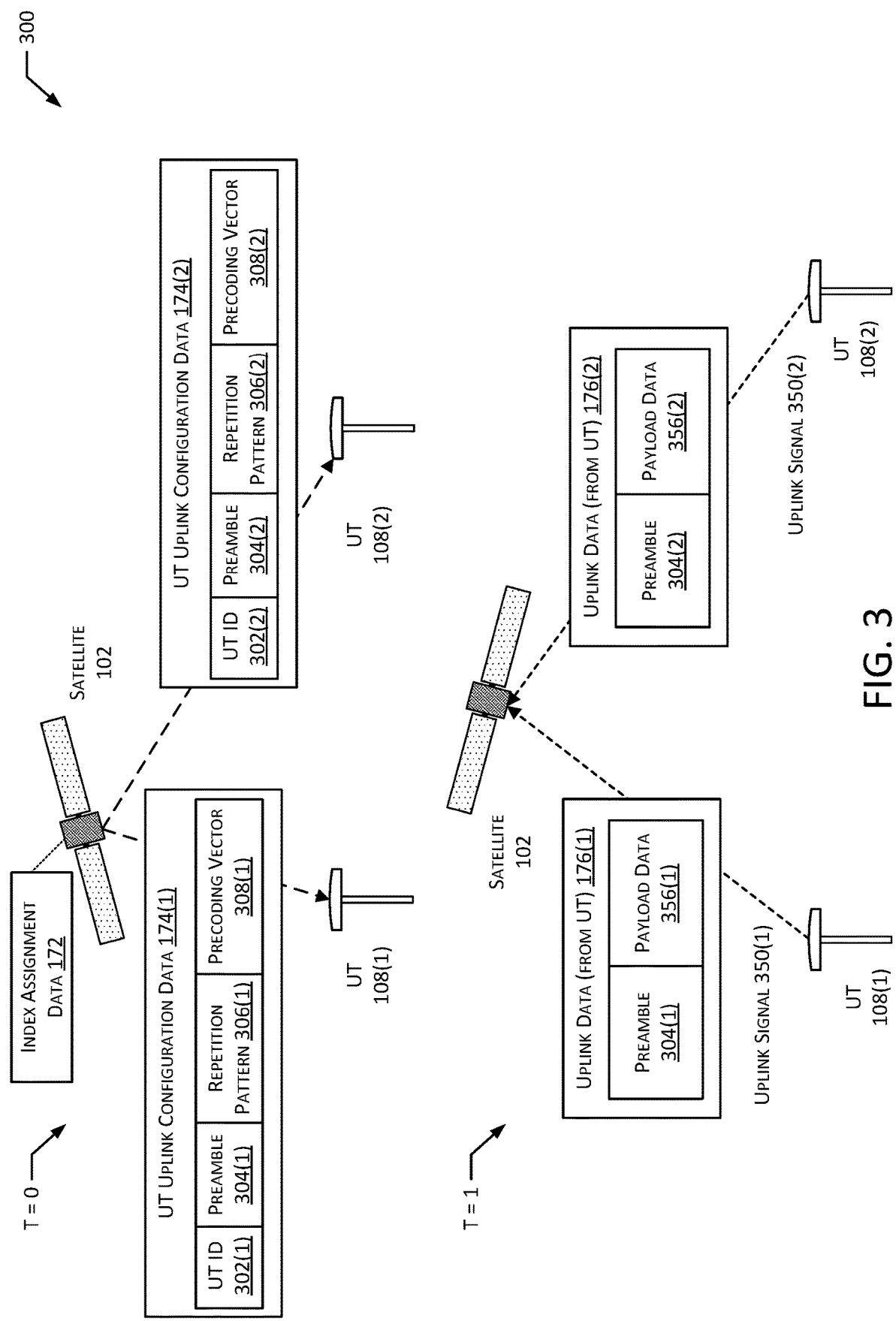
FIG. 3 illustrates a satellite providing UT uplink configuration data indicative of an index value to a UT that is then used to send an uplink signal representing uplink data, according to some implementations.

FIG. 3 illustrates at 300 a satellite providing UT uplink configuration data 174 indicative of parameters to a UT that are then used to send an uplink signal representing uplink data 176, according to some implementations.

At t=0 a satellite 102 transmits UT uplink configuration data (UCD) 174 to one or more UTs 108. The index assignment data 172 used by the satellite 102 specifies a particular preamble, repetition pattern, and precoding vector that are associated with particular UTs 108. The index assignment data 172 is discussed with regard to FIG. 4.

In this illustration, first UT UCD 174(1) is transmitted to UT 108(1) and second UT UCD 174(2) is transmitted to UT 108(2). The UT UCD 174 may comprise one or more of a UT identifier (ID) 302, preamble 304, repetition pattern 306, or a precoding vector 308.

The UT ID 302 is indicative of a particular UT 108 that is being provided communication service. For example, a unique UT ID 302 may be assigned to each UT 108 that is located within a particular spot, subbeam, or other grouping of UTs 108. The UT ID 302 may not necessarily be unique across all UTs 108.

The preamble 304 may comprise a specific pattern of symbols. The preamble 304 is associated with a combination of one or more of an initial phase angle, phase offset value, frequency, preamble duration, and so forth. Within the index assignment data 172, each preamble 304 may be unique. In some implementations, the preamble 304 may comprise one or more training symbols used to facilitate communication by providing a known sequence to the receiver, facilitating channel estimation.

The repetition pattern 306 may specify how often and when an uplink signal 350 conveying payload data 356 is to be repeated. The repetition pattern 306 may be specified with respect to a timing standard utilized by, or provided by, the satellite 102. For example, the satellite 102 may transmit a timing synchronization signal that is used to synchronize the clock of the UTs 108 with the satellite 102.

The precoding vector 308 may be used to specify a modification to the uplink signal 350 at transmit, or otherwise operate a transmitter. In one implementation, the precoding vector 308 may be used to specify particular transmit diversity to be used during operation of a transmitter such that the transmitted signal produces a specified beamforming effect at the receiver.

In some implementations, the UT UCD 174 may comprise a UT ID 302 and an assigned index value (IV) 402 that is indicative of a particular preamble 304 and associated combination of repetition pattern 306 and precoding vector 308 as specified in previously determined index assignment data 172.

In some implementations the UT UCD 174 may be addressed and transmitted to individual UTs 108. For example, the UT UCD 174 may be encrypted at the satellite 102 with a first key, allowing only the destination UT 108 to decrypt the UT UCD 174. In other implementations, the UT UCD 174 may be transmitted as a broadcast message that is received by a plurality of UTs 108. For example, the UT UCD 174 for many UTs 108 may be transmitted as part of a broadcast that is decryptable or otherwise readable to a plurality of UTs 108.

In some implementations, one or more of the index assignment data 172 or the UT UCD 174 may be determined by the uplink management system 170 or by another system. For example, the management system 150 may determine the index assignment data 172 that is then used to determine the UT uplink configuration data 174 sent to individual UTs 108.

In other implementations other techniques may be used. In one implementation the UMS 170 and the UT uplink system 178 may each separately determine UT UCD 174 that specifies one or more parameters that are then used to deterministically specify a particular index value 402. In one example, the UT UCD 174 may specify a particular mathematical operation that is to be applied to a particular input, such as the last 8 bits of the UT's media access control (MAC) address that is then used to determine an index value 402 associated with the UT 108. In other examples, other information such as user terminal data 160 may be used to determine a particular index value 402.

In still other implementations, the index value 402 for a given UT 108 may be previously stored, determined locally by the UT 108, and so forth. This may include data received from other sources, such as a time signal received from a GNSS receiver of the UT 108. For example, the UT 108 may determine the index value 402 based on a current clock time provided by the GNSS receiver and previously store data.

At t=1, based at least in part on the UT UCD 174, the UT 108 determines uplink data 176 and transmits an uplink signal 350 based on the uplink data 176. In the implementation shown, the UT uplink system 178 uses the UT UCD 174 associated with the particular UT 108 to determine a preamble 304. The preamble 304 provides an initial portion of an uplink signal 350 to the satellite 102. As mentioned earlier, the preamble 304 specifies a particular combination of repetition pattern 306 and precoding vector 308. The uplink data 176 may also comprise one or more training symbols that may be used by the satellite 102 to characterize the uplink, such as for channel estimation. In some implementations, the precoding vectors specify particular transmit parameters to be used during operation, serving to modify the transmitted signal to produce a specified effect at the receiver.

In another implementation, the UT uplink system 178 uses the index value 402 associated with the particular UT 108 to determine the preamble 304.

In some implementations, the uplink data 176 may include payload data 356. For example, the payload data 356 may comprise buffer data status (BDS). The BDS may indicate a quantity of data that is enqueued by the UT 108 for transmission to the satellite 102. Responsive to the BDS, the satellite 102 may issue a grant that assigns specific uplink resources to the UT 108. The UT 108 may then use this grant to transmit the enqueued upstream data 112.

In this illustration, the UT 108(1) transmits a first uplink signal 350(1) to the satellite 102, while the UT 108(2) is also transmitting a second uplink signal 350(2) to the satellite 102. Assuming these uplink signals 350 are transmitted on the set of frequencies, the received signal at the satellite 102 may be considered a summation of these uplink signals 350. In one implementation, the preambles 304 may be transmitted during a time interval designated as a preamble slot. The payload data 356 may then be sent during later time intervals or slots. In another implementation, the preambles 304 may be transmitted during the same time interval or slot as the payload data 356.

FIG. 4 illustrates at 400 index assignment data 172 that includes index values (IV) 402 indicative of particular preambles 304 and their associated combinations of repetition patterns 306 and precoding vectors 308, according to some implementations. The index assignment data 172 is described as a table by way of illustration and not as a limitation. In other implementations, other data structures may be used, or a formula or algorithm may be used to determine one or more of the attributes associated with a particular index value 402.

Each index value 402 is associated with a particular preamble 304. The preamble 304 is associated with particular preamble parameters, such as one or more of an initial phase angle, phase offset value, frequency, preamble duration, and so forth. In some implementations the preamble parameters may include one or more preamble symbols. The preamble parameters may be used to operate a transmitter to produce a particular preamble signal that is prepended to the uplink signal 350. The preamble signal may be used to determine a particular index value 402.

Each index value 402 is associated with a repetition pattern 306. Individual repetition patterns 306 may be predetermined. The repetition pattern 306 may specify how often an uplink signal 350 is repeated, and when the uplink signal 350 is repeated. In the example shown here, each set of uplink data 176 is transmitted twice. The repetition pattern 306 may specify a plurality of slot indices that are indicative of specific slots in a plurality of slots associated with the uplink to the satellite 102. Each of the slots may be associated with a particular time interval and may be coordinated to a common clock. In the notation listed here, the values within the brackets indicate the individual slot indicia. For example, index value 402(1) is associated with a repetition pattern 306 of "[1 2]", indicating that a first transmission is performed within slot 1, and a second transmission is performed within slot 2.

The repetition pattern 306 may be specified with respect to a timing standard utilized by, or provided by, the satellite 102. For example, the satellite 102 may transmit a timing synchronization signal that is used to synchronize the clock of the UT 108 with the satellite 102. In another example, the UT 108 and the satellite 102 may each utilize respective GNSS receivers to determine a common clock, and the repetition pattern 306 may be specified with respect to this common clock.

Each index value 402 is associated with a precoding vector 308. The precoding vectors 308 may be predetermined. The precoding vector 308 may be used to specify a modification to the uplink signal at transmit, or otherwise operate a transmitter. In one implementation, the precoding vector 308 may be used to specify particular transmit diversity to be used during operation of a transmitter such that the transmitted signal produces a specified beamforming effect at the receiver.

Each of the index values 402 is thus associated with a particular combination of repetition pattern 306 selected from the set of repetition patterns 306 and a precoding vector 308 selected from the set of precoding vectors 308. Within the set of index values 402, each combination is unique. In the notation listed here, the values within the brackets indicate a phase rotation to be applied to the signal. For example, index value 402(1) is associated with the precoding vector 308 of "[+1 +1]" indicating a phase rotation corresponding to +1 value with respect to a first signal dimension and +1 value with respect to a second signal dimension.

In some implementations the index assignment data 172 may be determined using an oversampled discrete Fourier transform (DFT) matrix. In the following example of the oversampled matrix, the repetition factor is fixed with a value of 2 and F is the oversampling favor 1, 2, 3, and so forth.

$$\begin{bmatrix} w^{0\cdot 0} & \cdots & w^{0\cdot k} & \cdots & w^{0\cdot M} \\ \vdots & \vdots & \vdots & \vdots & \vdots \\ w^{j\cdot 0} & \cdots & w^{j\cdot k} & \cdots & w^{j\cdot M} \\ \vdots & \vdots & \vdots & \vdots & \vdots \\ w^{(N-1)\cdot 0} & \cdots & w^{(N-1)\cdot k} & \cdots & w^{(N-1)\cdot M} \end{bmatrix} \quad \text{EQUATION 1}$$

where $M = (NF - 1)/F$ $w = e^{-2\pi i/N}$ $j = 0, 1, \ldots, N - 1$ $k = 0, \frac{1}{F}, \ldots, \frac{NF - 1}{F}$ In this example, each user has a 2-repetition precoding vector that is an oversampled DFT vector in the 2×1 domain. Continuing the example:
Oversampling factor=1 (N=2, F=1)
[+1 +1]
[+1 −1]
Expression 1
Oversampling factor=2 (N=2, F=2)
[+1 +1]
[+1 +j]
[+1 −1]
[+1 −j]
Expression 2

Figure 5:
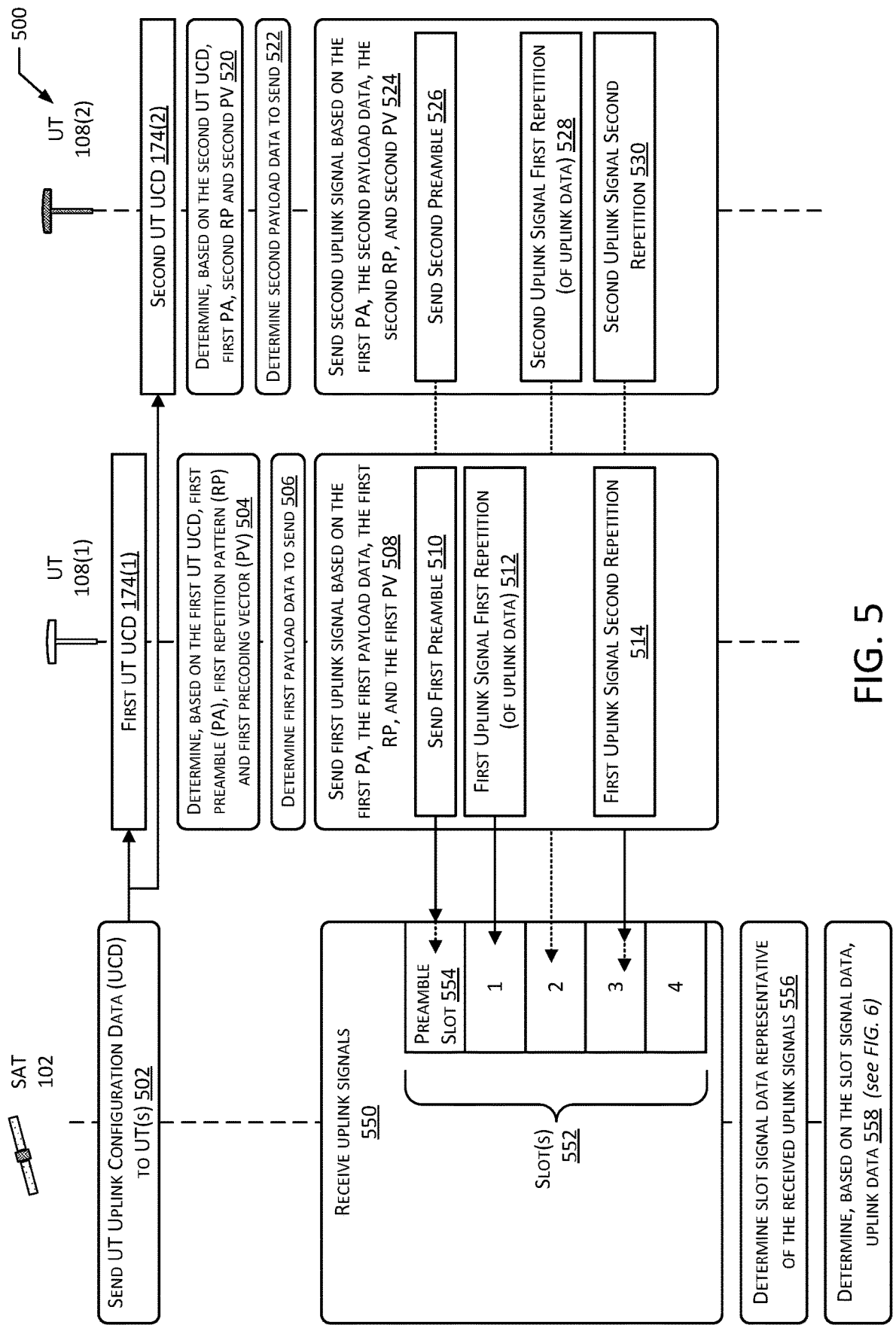
FIGS. 5-7 illustrate a process to provide grant-free access to a satellite by UTs, according to some implementations.

FIG. 5 illustrates at 500 a portion of a process to provide grant-free access to a satellite 102 by UTs 108, according to some implementations. The process may be implemented by one or more of the satellite 102, the UT 108, or the management system 150. In this illustration, by way of example and not as a limitation, the satellite 102 provides communication service to two UTs 108(1) and 108(2). The satellite 102 may also provide (not shown) a synchronization signal or other timing indication that may be used by the UT 108 to align to a common clock.

At 502 UT UCD 174 is sent to one or more UTs 108 being provided communication service. For example, the UT UCD 174 may be transmitted using the downlink transmitter(s) 278 of the satellite 102. As described with respect to FIG. 3, the UT UCD 174 may be indicative of IVs 402, preambles 304, repetition patterns 306, and precoding vectors 308 that are assigned to particular UTs 108.

The UTs 108 receive their respective UT UCD 174 and determine their respective parameters for accessing the grant-free uplink.

At 504 the first UT 108(1) receives the first UT UCD 174(1) and determines a first preamble (PA) 304(1), a first repetition pattern (RP) 306(1), and a first precoding vector (PV) 308(1). For example, the first RP 306(1) may specify "[1 3]".

In implementations where the UT UCD 174 comprises an IV 402, the IV 402 received may be used to retrieve from a locally stored copy of the index assignment data 172 the corresponding parameters. For example, based on the first IV 402(1) the UT uplink system 178 may retrieve the first RP 306(1) and the first PV 308(1) from the index assignment data 172.

At 506 the first UT 108(1) determines first payload data 356(1) to send to the satellite 102. For example, the first UT 108(1) may determine there is enqueued upstream data 112 for transmission and generates the first payload data 356(1) comprising BDS.

At 508 the first UT 108(1) sends first uplink signals 350(1). The first uplink signals 350(1) comprise a signal representing the first PA 304(1) that is transmitted during a preamble slot 554 at 510 and may also comprise signals representing the first payload data 356(1) that are transmitted during a plurality of slots 552 specified by the first RP 306(1). In this example, a first uplink signal first repetition 512 representing the first payload data 356(1) is sent during slot 552(1), while a first uplink signal second repetition 514 also representing the first payload data 356(1) is sent during slot 552(3).

The first uplink signals 350(1) encode the first uplink data 176(1). The first uplink signals 350(1) include a first preamble 304 specified by first preamble parameters associated with the first index value 402(1). The first uplink signals 350(1) may be generated based on the first PV 308(1) associated with the first index value 402(1).

Meanwhile, the satellite 102 may be receiving the uplink signals 350 during the respective slots 552.

At 520 the second UT 108(2) receives the second UT UCD 174(2) and determines a second PA 304(2), a second RP 306(2), and a second PV 308(2). For example, the second RP 306(2) may specify "[1 3]".

At 522 the second UT 108(2) determines second payload data 356(2) to send to the satellite 102. For example, the second UT 108(2) may determine there is enqueued upstream data 112 for transmission and generates the payload data 356(2) comprising BDS.

At 524 the second UT 108(2) sends second uplink signals 350(2). The second uplink signals 350(2) comprise a signal representing the second PA 304(2) that is transmitted during the preamble slot 554 at 526 and may also comprise signals representing the second payload data 356(2) that are transmitted during a plurality of slots 552 specified by the second RP 306(2). In this example, a second uplink signal first repetition 528 representing the second payload data 356(2) is sent during slot 552(2), while a second uplink signal second repetition 530 also representing the second payload data 356(2) is sent during the slot 552(3).

The second uplink signals 350(2) encode the second uplink data 176(2). The second uplink signals 350(2) include a second preamble 304 specified by second preamble parameters associated with the second index value 402(2). The second uplink signals 350(2) may be generated based on the second PV 308(2) associated with the second index value 402(2).

At 550, as described above, the satellite 102 may be receiving the uplink signals 350 transmitted during the respective slots 552, which may include a dedicated preamble slot 554. In the implementation shown here, a preamble slot 554 is specified. The preambles 304 may be transmitted by UTs 108 during the time interval associated with the preamble slot 554. In another implementation, the preambles 304 may be transmitted during other slots 552. Each slot 552 is indicative of a particular time interval. Each time interval may be specified with respect to a common clock, synchronization signal, or other timing mechanism.

At 556 the satellite 102 determines slot signal data that is representative of the received uplink signals received during particular slots 552. For example, the uplink signals 350 may be digitized to determine the slot signal data that is representative of the uplink signals 350.

At 558 uplink data 176 is determined based on the slot signal data. This is discussed in more detail with respect to FIG. 6.

Figure 6:
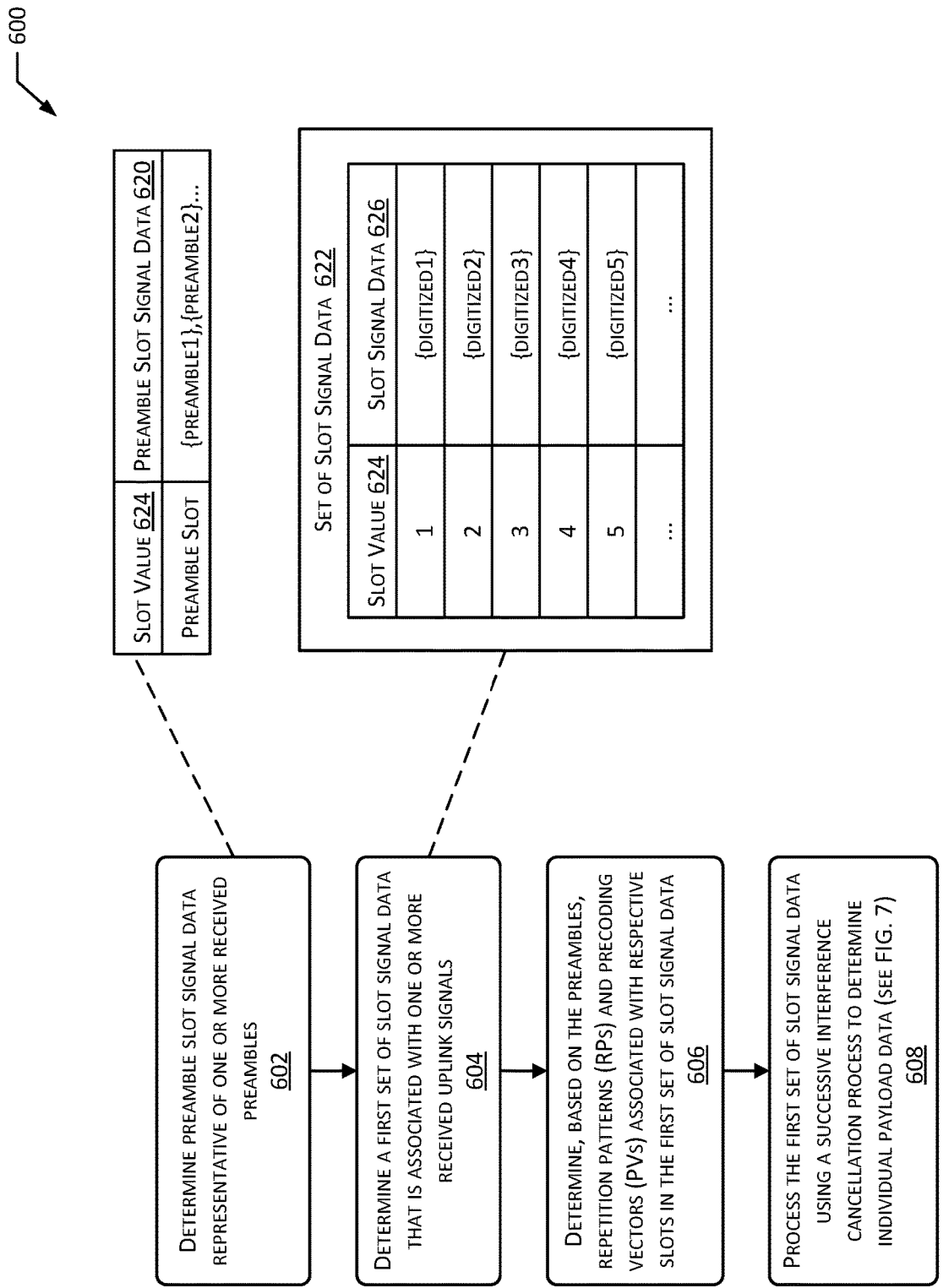

FIG. 6 illustrates at 600 another portion of the process to provide grant-free access to a satellite 102 by UTs 108, according to some implementations. The process may be implemented by one or more of the satellite 102, the UT 108, or the management system 150.

At 602 preamble slot signal data 620 (preamble signal data) is determined that comprises one or more preambles 304 received during the preamble slot 554.

At 604 a first set of slot signal data 622 is determined that is associated with one or more received uplink signals 350. The uplink signals 350 may be representative of one or more instances of uplink data 176 acquired during the plurality of slots 552. As illustrated, the set of slot signal data 622 may comprise slot values 624 indicative of a received slot 552 and slot signal data 626 comprising data representative of the uplink signals 350 received during the corresponding slot 552. The slot signal data 626 may be representative of the sum of uplink signals 350 received during the slot 552 by the uplink receiver(s) 280.

In some implementations, channel estimation data may be determined for each instance of one or more of the preamble slot signal data 620 or the slot signal data 626 and the respective instances of uplink signals 350 represented therein. The channel estimation data may be determined based at least in part on the training symbols included in the uplink data 176. For example, the receiver may use the training symbols to determine the channel estimation data indicative of one or more parameters associated with the channel.

In some implementations, the IV 402 may be determined by one or more of the UT 108 or the satellite 102 based on previously stored information. For example, the user terminal data 160 may be used to determine an index value 402.

At 606, based on the preambles 304, the respective RPs 306 and the PVs 308 associated with respective slots 552 in the first set of slot signal data 622 may be determined. For example, the preamble 304 may be used to determine the IV 402 and associated parameters.

At 608 the first set of slot signal data 622 is processed using a successive interference cancellation (SIC) process to determine individual uplink signals represented within the slot signal data 626 and determine the payload data 356. This process is discussed in more detail with regard to FIG. 7. During this process, the individual uplink signals 350 are decoded to determine the individual payload data 356. For example, the uplink signal 350 as recovered using the SIC process may be processed using one or more demodulation and decoding algorithms to determine the payload data 356.

Figure 7:
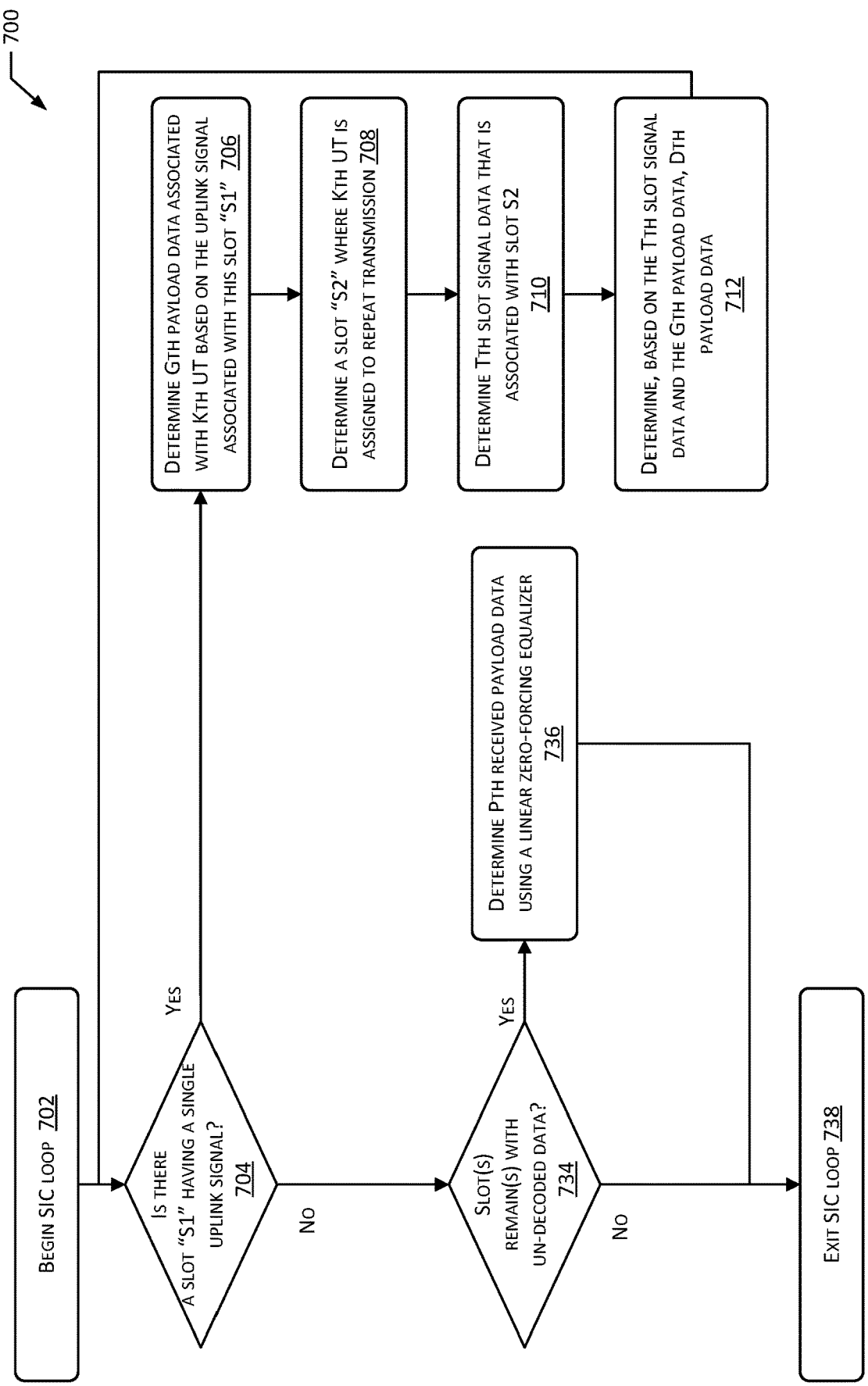

FIG. 7 illustrates at 700 a successive interference cancellation (SIC) portion of the process to provide grant-free access to a satellite 102 by UTs 108 according to some implementations. The process may be implemented by one or more of the satellite 102, the UT 108, or the management system 150.

In the implementation depicted, the SIC may be implemented as a loop that utilizes a plurality of iterations to recover the uplink signals 350 represented within the slot signal data 626.

At 702 the loop begins and proceeds to 704.

At 704 a determination is made as to whether any of the slots 552 within a specified window or time interval contain a single uplink signal 350. For example, the slot signal data 626 may be analyzed to determine a slot value 624 that contains only a single preamble 304 or is associated with a single IV 402. In this illustration, the slot 552 that contains a single uplink signal 350 is designated slot "S1". If yes, the process proceeds to 706.

At 706 Gth payload data 356(G) associated with a Kth UT 108(K) is determined based on the uplink signal 350 associated with slot S1. For example, given the preamble 304 of the single uplink signal 350(1) within the slot S1 the UMS 170 is able to determine the repetition pattern 306 and precoding vector 308 associated with the UT 108(K). With this information, the UMS 170 is able to determine other slots 552 within which another repetition of the same uplink signal 350 representing the same payload data 356 has been received.

In the following operations, the known uplink signals 350 are successively removed from the combined received signals that are represented by slot signal data 626 for other slots.

At 708 a slot "S2" is determined where the Kth UT 108(K) is assigned to repeat transmission. For example, based on the repetition pattern 306 associated with the preamble 304 of the first uplink signal 350(1), the UMS 170 uses the index assignment data 172 to look up other slots 552 that will include a repeated transmission. This results in the system determining duplicate slots 552 that comprise two or more slots 552 that are associated with repeated transmission from one or more UTs 108.

At 710 Tth slot signal data 626(T) is determined that is associated with slot S2. For example, a buffer may be used to store the slot signal data 626 for processing.

At 712 Dth payload data 356(D) is determined based on the Tth slot signal data 626(T) and the Gth uplink data 176(G). For example, a subtraction or cancellation operation may be used to remove the first uplink signal 350(1) from the received uplink signal as represented by the slot signal data 626(T). In this example, the slot S2 comprises data from two uplink signals received at the same time. By cancelling out the known uplink signal 350(1) the other uplink signal 350 associated with another UT 108 may be recovered. Once recovered, the uplink signal 350 may be decoded to determine the payload data 356(G).

The process may then return to 704, continuing the iterate. At 704, if no remaining slot is associated with a single uplink signal the process proceeds to 734.

At 734 a determination is made as to whether any slots 552 contain un-decoded data. Following the cancellation operations of blocks 704-712, residual slot signal data 626 may still include duplicate slots 552 having uplink signals that were received in the same slots due to the respective UTs 108 operating using the same repetition pattern 306.

If un-decoded data remains for any of the slots 552, the process proceeds to 736. If not, the process proceeds to 738.

At 736 Pth received uplink data 176(P) is determined using a linear zero-forcing equalizer. The uplink signals 350 may be extracted from the residual slot signal data 626 using one or more techniques. In implementations in which the payload data 356 is sent via a full rank multiple-input and multiple-output (MIMO) channel, the linear zero-forcing equalizer may be used to recover the uplink signals 350 that may be decoded to determine the payload data 356(P). In other implementations, other techniques may be used to determine the payload data 356(P). The process may then proceed to 738 and exit the SIC loop.

Figure 8:
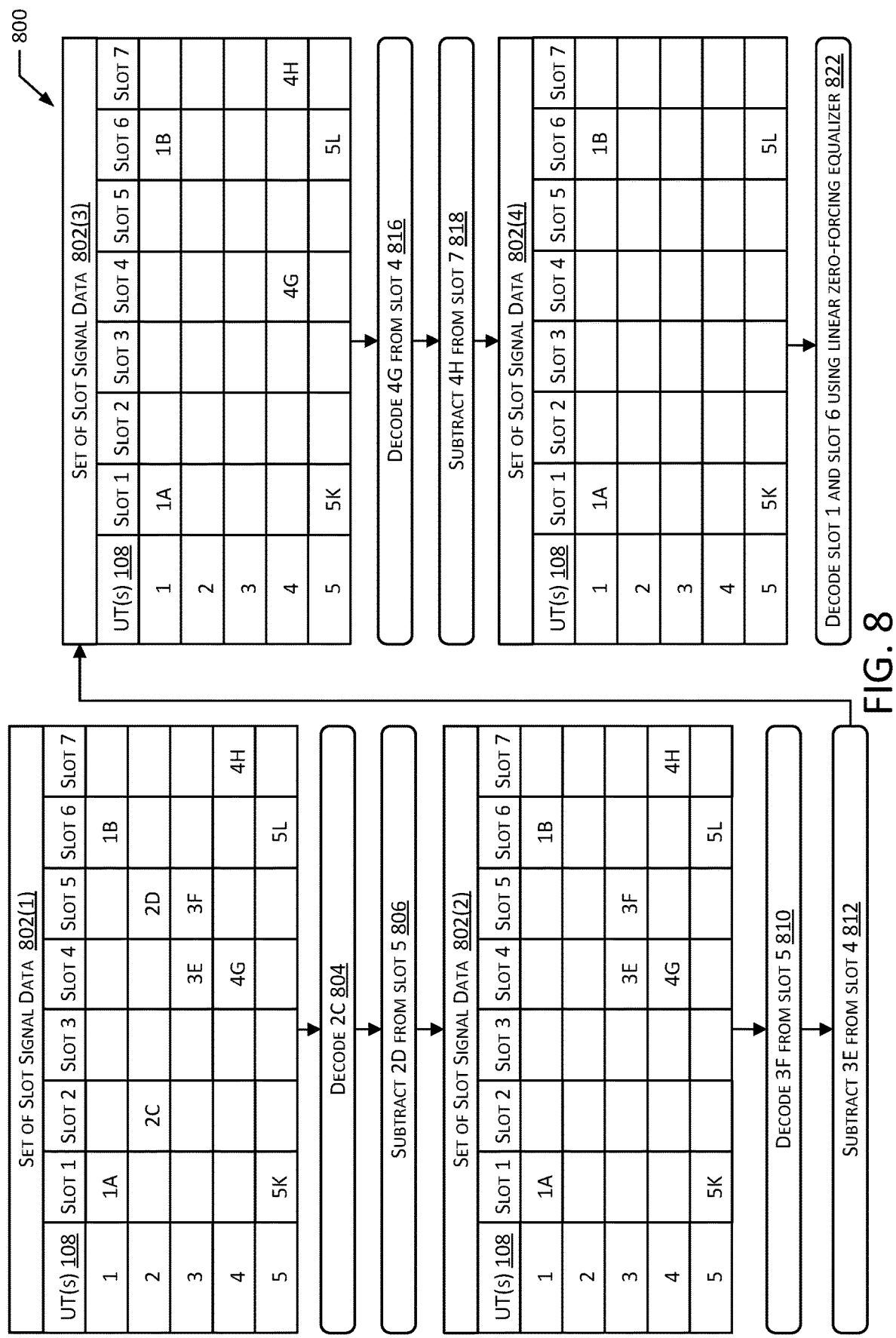
FIG. 8 depicts a scenario that utilizes the process, according to some implementations.

FIG. 8 depicts a scenario 800 that utilizes the process of FIGS. 5-7 to determine uplink signals 350 in a grant-free uplink that are then decoded to provide uplink data 176, according to some implementations. This process may be performed at least in part by the satellite 102. In this illustration the repetition patterns 306 specify transmitting each uplink signal 350 representing the same payload data 356 twice.

A variation of the set of slot signal data 802 is shown in this figure. In this variation of the set of slot signal data 802, individual UTs 108 are depicted as rows and columns denote slots 552(1)-(7). For reference each uplink signal 350 has a letter designator appended. For example, UT 108(3) transmits a first repetition "3E" in slot 4 and a second repetition "3F" in slot 5. In some implementations a phase rotation may be applied to each transmission that is based on the UTs 108 and the slots 552. For ease of illustration, and not by way of limitation, the preamble slot 554 and associated preambles 304 sent during the preamble slot 554 are not shown in this figure.

At 802(1) a set of slot signal data 802(1) is determined. As shown in this illustration, some slots include no transmissions, some include one transmission, and other slots two transmissions.

The set of slot signal data 802(1) is processed to determine a first slot that contains a single uplink signal 350, such as slot 2 that contains uplink signal "2C". Uplink signal 2C is decoded to determine the index value 402 and associated RP 306. In this illustration, the RP 306 for transmission from the UT 108 indicates a duplicate slot in which another repeat of the transmission is expected during slot 5.

At 806 a reconstruction of uplink signal 2D is subtracted from slot 5 to leave signal 3F as residual slot signal data 626. For example, the decoded payload data 356 and the known index value 402 allows the satellite 102 to determine a reconstruction of uplink signal 2D. As only two uplink signals are detected within slot 5, by subtracting signal 2D an uplink signal is recovered. This uplink signal, in this example uplink signal 3F, is then decoded.

An updated set of slot signal data 802(2) is depicted with the known and decoded repetitions removed. A next slot 552 is determined that has a single uplink signal, in this example slot 5 containing uplink signal 3F.

At 810 uplink signal 3F is decoded to determine its associated RP 306, and thus a duplicate slot indicating that a repetition is expected in slot 4.

At 812 a reconstruction of signal 3E is determined and subtracted from the signal in slot 4, revealing uplink signal 4G.

An updated set of slot signal data 802(3) is depicted with the known and decoded repetitions removed. A next slot 552 is determined that has a single uplink signal, in this example slot 4 containing uplink signal 4G.

At 816 recovered uplink signal 4G in slot 4 is decoded to determine its associated RP 306, and thus a duplicate slot indicating that a repetition is expected in slot 7.

At 818 uplink signal 4H is subtracted from slot 7, revealing no recovered payload data 356.

An updated set of slot signal data 802(4) is depicted with the known and decoded repetitions removed. In this illustration, slots 1 and slot 6 both have two uplink signals each, 1A and 5K in slot 1 and 1B and 5L in slot 6. This is due to UT 108(1) and UT 108(5) having the same repetition pattern 306.

At 822 slots 1 and 6 are decoded using a linear zero-forcing equalizer. As described at 736, given a full rank MIMO channel, it is possible to recover the payload data 356 conveyed by the uplink signals that occupy the same slot 552.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed have been described with respect to satellite communications. In other implementations, these techniques may be applied to other communications systems such as terrestrial wireless systems, wireless systems utilizing aerostats, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EE-PROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a first device comprising:
      a first network interface; and
      a first set of one or more processors executing instructions to:
         receive one or more received signals during a first plurality of time intervals;
         determine a set of signal data, wherein each instance of signal data in the set is representative of a portion of the one or more received signals that are associated with one of the first plurality of time intervals;
         determine, based on the set of signal data, a first set of preambles;
         determine, based on the first set of preambles, one or more of repetition patterns or precoding vectors that are associated with at least a portion of the one or more received signals associated with the first plurality of time intervals; and
         determine a set of payload data based on the set of signal data and the one or more of the repetition patterns or the precoding vectors.

2. The system of claim 1, the first set of one or more processors further executing the instructions to:
   determine respective preambles associated with individual ones of the one or more received signals; and
   determine the one or more of the repetition patterns or the precoding vectors, using the respective preamble to retrieve the one or more of the repetition patterns or the precoding vectors from previously stored data.

3. The system of claim 1, the first set of one or more processors further executing the instructions to:
   determine index assignment data that associates:
      a respective preamble with a respective repetition pattern and a respective precoding vector; and
      the respective preamble with a respective one of a set of second devices; and
   send, using the first network interface, configuration data to the set of second devices, wherein the configuration data is indicative of:
      a respective second device of the set of second devices, and
      the respective preamble, and one or more of:
         the respective repetition pattern, or
         the respective precoding vector.

4. The system of claim 1, the first set of one or more processors further executing the instructions to:
   send, using the first network interface, timing data associated with the first plurality of time intervals; and
   wherein respective ones of the repetition patterns specify a plurality of time intervals in the first plurality of time intervals with respect to the timing data.

5. The system of claim 1, the first set of one or more processors further executing the instructions to:
   determine a first time interval of the first plurality of time intervals that contains only a first received signal;
   determine first payload data based on the first received signal;
   determine a second time interval of the first plurality of time intervals that is associated with a repetition of the first payload data;
   determine first signal data, of the set of signal data, that is associated with the second time interval; and
   determine second payload data based on the first payload data and the first signal data.

6. The system of claim 1, the first set of one or more processors further executing the instructions to:
- determine, based on the repetition patterns, duplicate time intervals of the first plurality of time intervals that are associated with repeated transmissions from a plurality of second devices;
- determine duplicate signal data, of the set of signal data, that is associated with the duplicate time intervals; and
- determine at least a portion of the set of payload data based on the duplicate signal data and using a linear zero-forcing equalizer.

7. The system of claim 1, the first set of one or more processors further executing the instructions to:
- determine index assignment data that associates:
  - an index value with a respective preamble, a respective repetition pattern, and a respective precoding vector; and
- send, using the first network interface, configuration data to a second device wherein the configuration data comprises the index value.

8. The system of claim 1, the first set of one or more processors further executing the instructions to:
- determine first data associated with a second device wherein the first data is indicative of one or more of:
  - a geographic location of the second device,
  - a media access control address of the second device,
  - a network access of the second device,
  - a type of the second device,
  - a subbeam associated with the second device, or
  - cryptographic data associated with the second device; and
- determine, based at least in part on the first data, one or more of a preamble, a repetition pattern, or a precoding vector that is associated with the second device.

9. The system of claim 8, the second device comprising:
- a second network interface; and
- a second set of one or more processors executing instructions to:
  - determine second data associated with the second device;
  - determine, based on the second data, one or more of the preamble, the repetition pattern, or the precoding vector that is associated with the second device;
  - transmit, using the second network interface, the preamble; and
  - transmit, using the second network interface and based on one or more of the repetition pattern or the precoding vector, first payload data.

10. A method comprising:
- receiving one or more received signals associated with a first plurality of time intervals, wherein each time interval is associated with a specified time interval;
- determining a set of signal data, wherein each instance of signal data in the set is representative of a portion of the one or more received signals that are associated with one of the first plurality of time intervals;
- determining, based on the set of signal data, a first set of preambles;
- determining, based on the first set of preambles, one or more of repetition patterns or precoding vectors that are associated with at least a portion of the one or more received signals associated with the first plurality of time intervals; and
- determining a set of payload data based on the set of signal data and the one or more of the repetition patterns or the precoding vectors.

11. The method of claim 10, the determining the one or more of the repetition patterns or the precoding vectors comprising:
- retrieving the one or more of the repetition patterns or the precoding vectors from previously stored data, using individual preambles of the first set of preambles.

12. The method of claim 10, further comprising:
- determining first data that associates:
  - a respective preamble with a respective repetition pattern and a respective precoding vector; and
  - the respective preamble with a respective one of a set of devices; and
- sending second data to the set of devices, wherein the second data is indicative of:
  - a respective device of the set of devices, and
  - the respective preamble, and one or more of:
    - the respective repetition pattern, or
    - the respective precoding vector.

13. The method of claim 10, wherein the repetition patterns specify a plurality of indices that are indicative of specific time intervals in the first plurality of time intervals, and further wherein the first plurality of time intervals are synchronized to a timing standard.

14. The method of claim 10, further comprising:
- determining a first time interval of the first plurality of time intervals that contains only a first received signal;
- determining first payload data based on the first received signal;
- determining a second time interval of the first plurality of time intervals that is associated with a repetition of the first payload data;
- determining first signal data that is associated with the second time interval; and
- determining second payload data based on the first payload data and the first signal data.

15. The method of claim 10, further comprising:
- determining, based on the repetition patterns, duplicate time intervals of the first plurality of time intervals that are associated with repeated transmissions from a plurality of devices;
- determining duplicate signal data, of the set of signal data, that is associated with the duplicate time intervals; and
- determining at least a portion of the set of payload data based on the duplicate signal data and using a linear zero-forcing equalizer.

16. A system comprising:
- a first device comprising:
  - a first network interface; and
  - a first set of one or more processors executing instructions to:
    - receive a plurality of signals, wherein individual ones of the plurality of signals are associated with one of a first plurality of time intervals;
    - determine, based on the plurality of signals, a set of signal data, wherein each instance of the set of signal data is representative of a portion of the plurality of signals that are received during respective ones of the first plurality of time intervals;
    - determine, based on a set of preambles, one or more of repetition patterns or precoding vectors that are associated with at least a portion of the plurality of signals associated with the first plurality of time intervals; and
    - determine a set of payload data by processing the set of signal data using the one or more of the repetition patterns or the precoding vectors.

17. The system of claim 16, the first set of one or more processors further executing the instructions to:
   transmit, using the first network interface, configuration data, wherein the configuration data is indicative of:
      a respective preamble, and
      a respective repetition pattern.

18. The system of claim 16, wherein each repetition pattern specifies a plurality of indices, wherein each index of the plurality of indices is indicative of a specific time interval in the first plurality of time intervals.

19. The system of claim 16, the first set of one or more processors further executing the instructions to:
   determine a first time interval of the first plurality of time intervals that contains only a first received signal;
   determine first payload data based on the first received signal;
   determine a second time interval of the first plurality of time intervals that is associated with a repetition of the first payload data;
   determine first signal data, of the set of signal data, that is associated with the second time interval; and
   determine second payload data based on the first payload data and the first signal data.

20. The system of claim 16, the first set of one or more processors further executing the instructions to:
   determine, based on the repetition patterns, duplicate time intervals of the first plurality of time intervals that are associated with repeated transmissions from a plurality of devices;
   determine duplicate signal data, of the set of signal data, that is associated with the duplicate time intervals; and
   determine at least a portion of the set of payload data based on the duplicate signal data and using a linear zero-forcing equalizer.

* * * * *